United States Patent
Barus et al.

(10) Patent No.: US 7,057,414 B2
(45) Date of Patent: Jun. 6, 2006

(54) AVOIDING OSCILLATION IN SELF-SYNCHRONOUS BI-DIRECTIONAL COMMUNICATION SYSTEM

(75) Inventors: Daniel J. Barus, Glenham, NY (US); Eileen M. Behrendt, Mahopac, NY (US); Jeffrey R. Biamonte, Hyde Park, NY (US); Raymond J. Harrington, Staatsburg, NY (US); Timothy M. Trifilo, Walden, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/752,956

(22) Filed: Jan. 7, 2004

(65) Prior Publication Data

US 2005/0146358 A1    Jul. 7, 2005

(51) Int. Cl.
*H03K 19/173* (2006.01)
(52) U.S. Cl. .............................. 326/46; 326/86; 710/25
(58) Field of Classification Search ................. 326/46, 326/86; 710/25, 58, 112, 305
See application file for complete search history.

(56) References Cited

U.S. PATENT DOCUMENTS

| | | | |
|---|---|---|---|
| 4,383,300 A | 5/1983 | Geopfarth | 364/558 |
| 5,197,143 A * | 3/1993 | Lary et al. | 710/305 |
| 5,339,395 A * | 8/1994 | Pickett et al. | 710/305 |
| 5,514,979 A | 5/1996 | Collins et al. | 326/27 |
| 5,694,614 A * | 12/1997 | Bennett | 710/305 |
| 6,121,758 A | 9/2000 | Bellina et al. | 323/211 |
| 6,182,230 B1 | 1/2001 | Gholami et al. | 713/300 |
| 6,205,493 B1 * | 3/2001 | Dreyer et al. | 710/5 |
| 6,487,625 B1 | 11/2002 | Staver et al. | 710/305 |
| 6,771,556 B1 * | 8/2004 | Aden | 365/230.04 |
| 6,804,735 B1 * | 10/2004 | Singh et al. | 710/112 |
| 6,876,229 B1 * | 4/2005 | Barus et al. | 326/82 |

OTHER PUBLICATIONS

Barus, et al., "Method and System for Providing Bidirectional Asynchronous Communication", pending U.S. Appl. No. 10/668,488, filed Sep. 23, 2003.

* cited by examiner

*Primary Examiner*—Vibol Tan
(74) *Attorney, Agent, or Firm*—Lily Neff, Esq.; Jill M. Breedlove, Esq.; Heslin Rothenberg Farley & Mesiti P.C.

(57) ABSTRACT

In a bi-directional, self-synchronous bus for communication between semiconductor devices, a logic delay is provided as a flag to a state machine control for indicating that the bus is making a transition from a low to a high state. The logic delay causes the bus to adaptively idle until the bus settles, making it amenable for a wide variety of bus sizes and topologies. In this way, oscillation of the bus is avoided without slowing the speed of the state machine clock.

10 Claims, 7 Drawing Sheets

| PRESENT STATE | | | INPUTS | | | NEXT STATE | | |
|---|---|---|---|---|---|---|---|---|
| A | B | | M | S | D | X | Y | |
| 0 | 0 | A | 0 | 0 | 0 | 0 | 0 | A |
| | | | 0 | 0 | 1 | 1 | 1 | D |
| | | | 0 | 1 | 0 | 0 | 0 | A |
| | | | 0 | 1 | 1 | 1 | 1 | D |
| | | | 1 | 0 | 0 | 0 | 0 | A |
| | | | 1 | 0 | 1 | 1 | 1 | D |
| | | | 1 | 1 | 0 | 0 | 0 | A |
| | | | 1 | 1 | 1 | 1 | 1 | D |
| 0 | 1 | B | 0 | 0 | 0 | 0 | 1 | B |
| | | | 0 | 0 | 1 | 0 | 1 | B |
| | | | 0 | 1 | 0 | 0 | 1 | B |
| | | | 0 | 1 | 1 | 0 | 1 | B |
| | | | 1 | 0 | 0 | 0 | 0 | A |
| | | | 1 | 0 | 1 | 0 | 0 | A |
| | | | 1 | 1 | 0 | 0 | 0 | A |
| | | | 1 | 1 | 1 | 0 | 0 | A |
| 1 | 0 | C | 0 | 0 | 0 | 1 | 0 | C |
| | | | 0 | 0 | 1 | 1 | 0 | C |
| | | | 0 | 1 | 0 | 0 | 0 | A |
| | | | 0 | 1 | 1 | 0 | 0 | A |
| | | | 1 | 0 | 0 | 1 | 0 | C |
| | | | 1 | 0 | 1 | 1 | 0 | C |
| | | | 1 | 1 | 0 | 0 | 0 | A |
| | | | 1 | 1 | 1 | 0 | 0 | A |
| 1 | 1 | D | 0 | 0 | 0 | 1 | 1 | D |
| | | | 0 | 0 | 1 | 1 | 1 | D |
| | | | 0 | 1 | 0 | 0 | 1 | B |
| | | | 0 | 1 | 1 | 0 | 1 | B |
| | | | 1 | 0 | 0 | 1 | 0 | C |
| | | | 1 | 0 | 1 | 1 | 0 | C |
| | | | 1 | 1 | 0 | 1 | 1 | D |
| | | | 1 | 1 | 1 | 1 | 1 | D | fig. 11

US 7,057,414 B2

AVOIDING OSCILLATION IN SELF-SYNCHRONOUS BI-DIRECTIONAL COMMUNICATION SYSTEM

TECHNICAL FIELD

This invention relates generally to communications between semiconductor devices, and more particularly, to avoiding oscillation in communications between devices coupled via a self-synchronous bi-directional bus.

BACKGROUND OF THE INVENTION

Existing complex programmable logic devices (CPLD), field programmable gate array (FPGA), and application specific integrated circuit (ASIC) technologies do not directly support the implementation of internal bi-directional signals without the use of a dedicated direction control signal.

A common method of implementing an asynchronous bi-directional half duplex communications link is the use of an open drain or open collector driver and a logic receiver at each end of the communications link which has a pull up resistor to a common voltage. Multiple devices can be connected to the same link. In the case of multiple devices on the same link, when one device talks, all other devices on the net receive the message. In this case, an agreed means of addressing is used so that the intended recipient knows the message is for him. At times it is desirable to isolate certain devices on such a link because multiple devices may share the same address, or there may not be enough addresses to accommodate the number of devices. Alternatively, it may be desirable to isolate a failing device from the link so that the failing device does not render the link inoperative. Many other instances arise wherein it is desirable to be able to inexpensively route and manipulate such communications links. Typically, open drain and open collector communication links can be isolated, switched and routed using analog switches. Analog switches are large and expensive, limiting the complexity of switching. Accordingly, it is desirable to be able to switch and route such signals using logic gates which could reside on a CPLD, FPGA, ASIC or other highly integrated, inexpensive device.

It is furthermore desirable to provide a method for avoiding oscillation on a self-synchronous bi-directional bus. It is furthermore desirable that such a method avoid oscillation without requiring a reduction in speed of communications on the bus.

SUMMARY OF THE INVENTION

The shortcomings of the prior art are overcome and additional advantages are provided through technique for avoiding oscillation in communications between devices coupled via a self-synchronous bi-directional bus.

In a bi-directional, self-synchronous bus for communication between semiconductor devices, a logic delay signal is provided as a flag to a state machine control for indicating that the bus is making a transition from a low to a high state. The logic delay signal causes the bus to adaptively idle until the bus settles, making it amenable for a wide variety of bus sizes and topologies. In this way, oscillation of the bus is avoided without slowing the speed of the state machine clock.

In a preferred embodiment of the present invention, a first bus driver receives a first drive signal based on a current first state, a current second state and a second signal, and generates therefrom a first signal; and a second bus driver receives a second drive signal based on the current first state, the current second state and the first signal, and generates therefrom the second signal. A first input encoder logic receives the current first state, the current second state, the first signal and the second signal, and generates therefrom a next first state; and a second input encoder logic receives the current first state, the current second state, the first signal and the second signal, and generates therefrom a next second state. The first input encoder logic and the second input encoder logic each respectively receive a logic delay signal for causing the state machine to remain in a wait state until the logic delay signal transitions from a low logic level to a high logic level.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figures 4, 6:
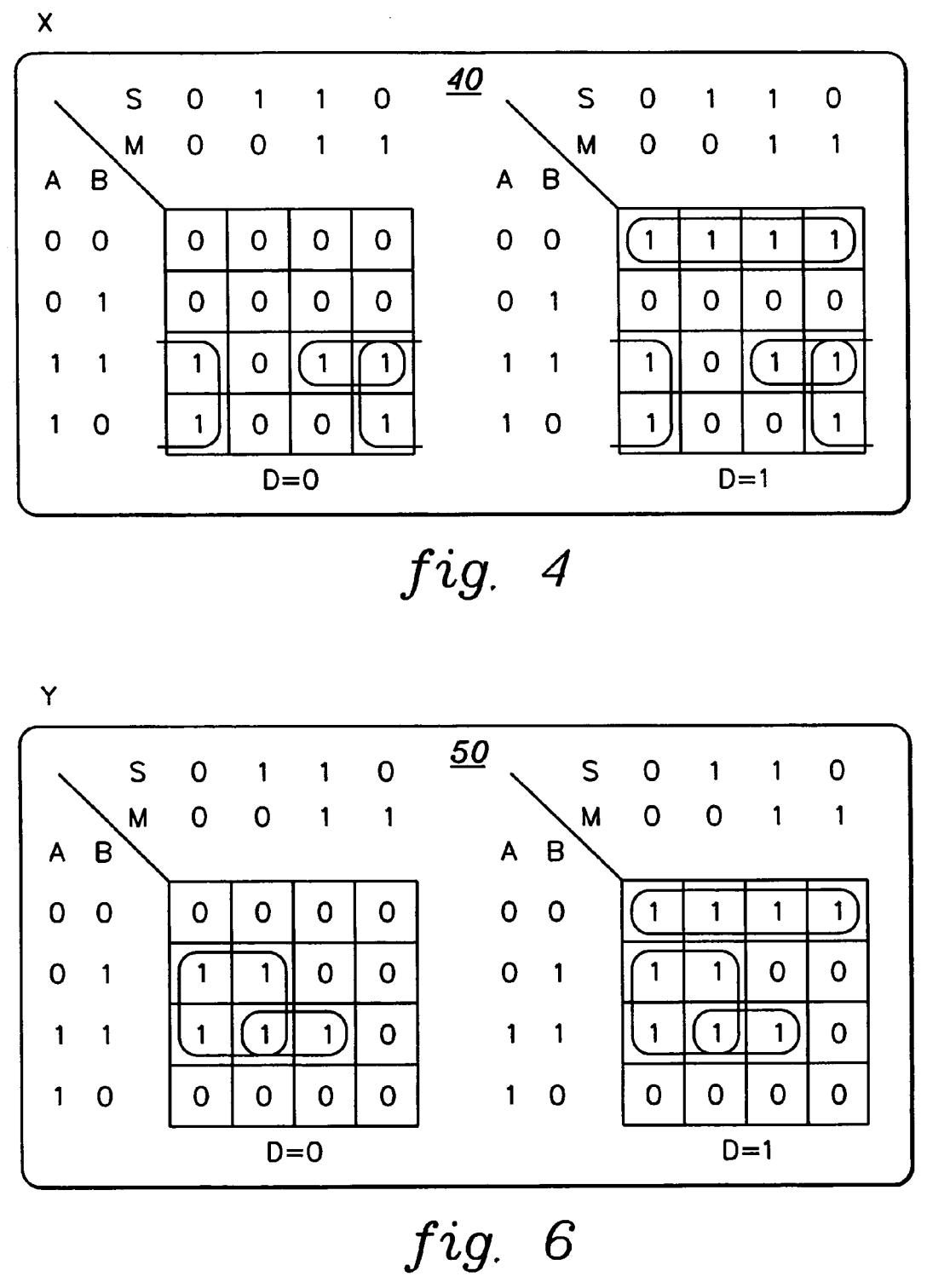

FIG. 4 is a Karnaugh map for the logic circuit of FIG. 3;

FIG. 6 is a Karnaugh map for the logic circuit of FIG. 5;

FIG. 11 is a state transition table for the state diagram of FIG. 10.

BEST MODE FOR CARRYING OUT THE INVENTION

Presented herein is a technique for avoiding oscillation in a bi-directional, self-synchronous bus for communication between semiconductor devices.

U.S. patent application Ser. No. 10/668,488, filed Sep. 23, 2003 and assigned to the instant assignee, describes a communication system and method for establishing bi-directional communication between semiconductor devices and for separating bi-directional signals therebetween into two unidirectional push-pull signals that can be routed and switched using logic gates. Such a communication system advantageously provides for asynchronous, bi-directional communication without requiring a directional control line. U.S. patent application Ser. No. 10/668,488 is incorporated by reference herein in its entirety.

The hereinabove described communication system is useful in open collector and open drain circuit configurations. As buses get larger and faster, however, the intrinsic capacitance thereof gets proportionately larger. And as bus capacitance directly affects the transition speed of the bus, slower rise times occur at the outputs. The result may be oscillation of the signal on the bus.

Figure 1:
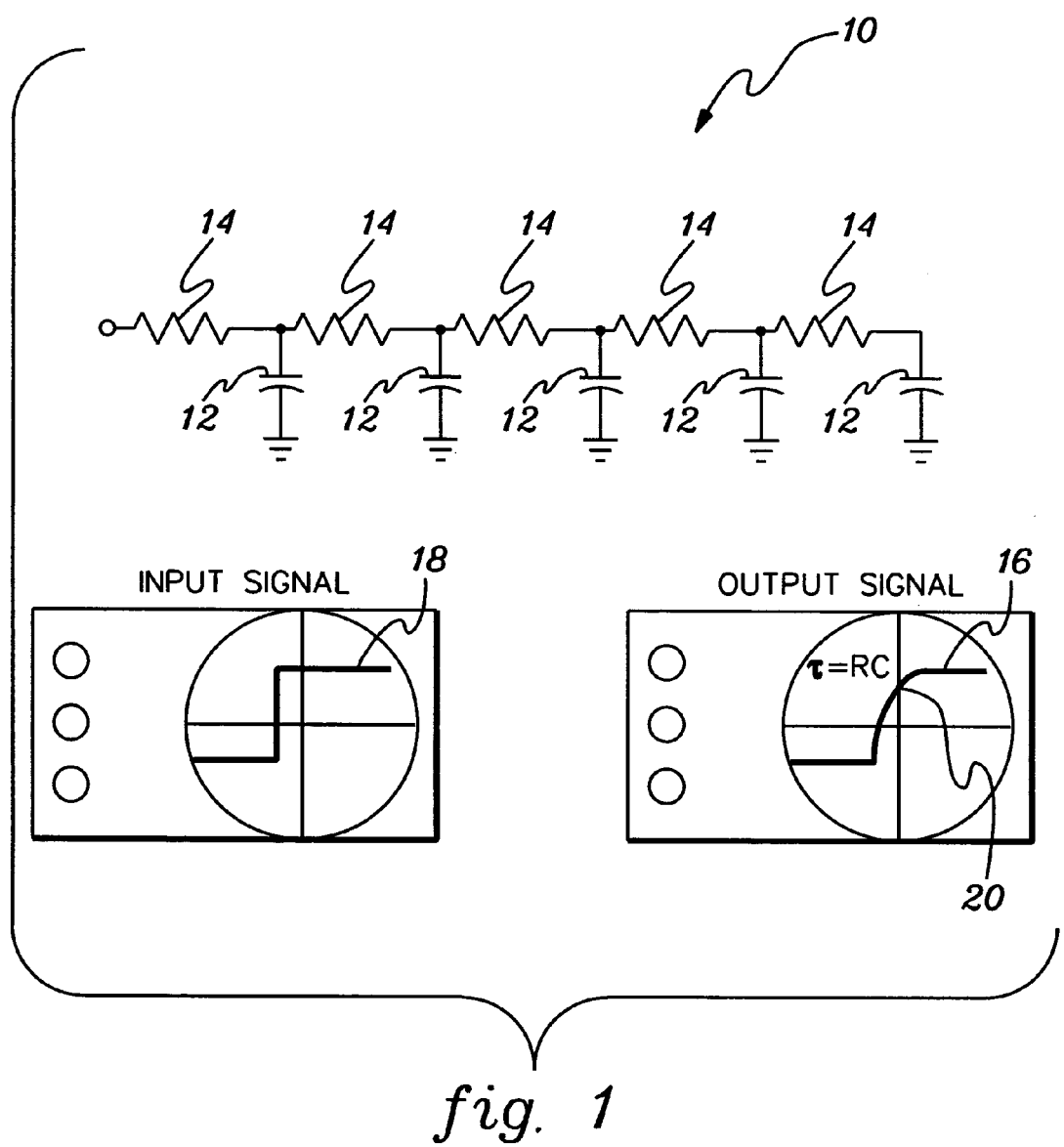
FIG. 1 depicts an exemplary bus for communication between devices of a type that exhibits oscillation due to intrinsic capacitance thereof.

FIG. 1 illustrates an open drain (or open collector) bus 10 of a type for which oscillation may be a problem, particularly as the length, and hence the capacitive and resistive losses get larger. Bus 10 comprises intrinsic capacitance 12 and resistance 14, which result in an exponential rise in an output signal 16 in response to a data signal 18 on the bus. As the output signal 16 is rising, it is interpreted as a logic low signal until it crosses a threshold voltage 20, e.g., about 1.7 volts. As the state machine clock samples the output signal prior to crossing the threshold voltage, it detects that the receiver is still at a logic low signal, and in turn attempts to drive a low signal back to the transmitter, causing oscillation on the bus. This problem occurs when the rise time on the bus is relatively slow with respect to the speed of the state machine clock. Although reducing the speed of the state machine clock would tend to solve the problem, it is not an effective solution because this would disadvantageously decrease the maximum bit rate of the bus.

In accordance with preferred embodiments of the present invention, the hereinabove described oscillation effect is avoided by identifying the condition on the bus and for causing the bus to adaptively idle until it settles. Advantageously, this is applicable to a wide variety of bus sizes and topologies, such as, for example, linear or star topologies, among others.

Figure 2:
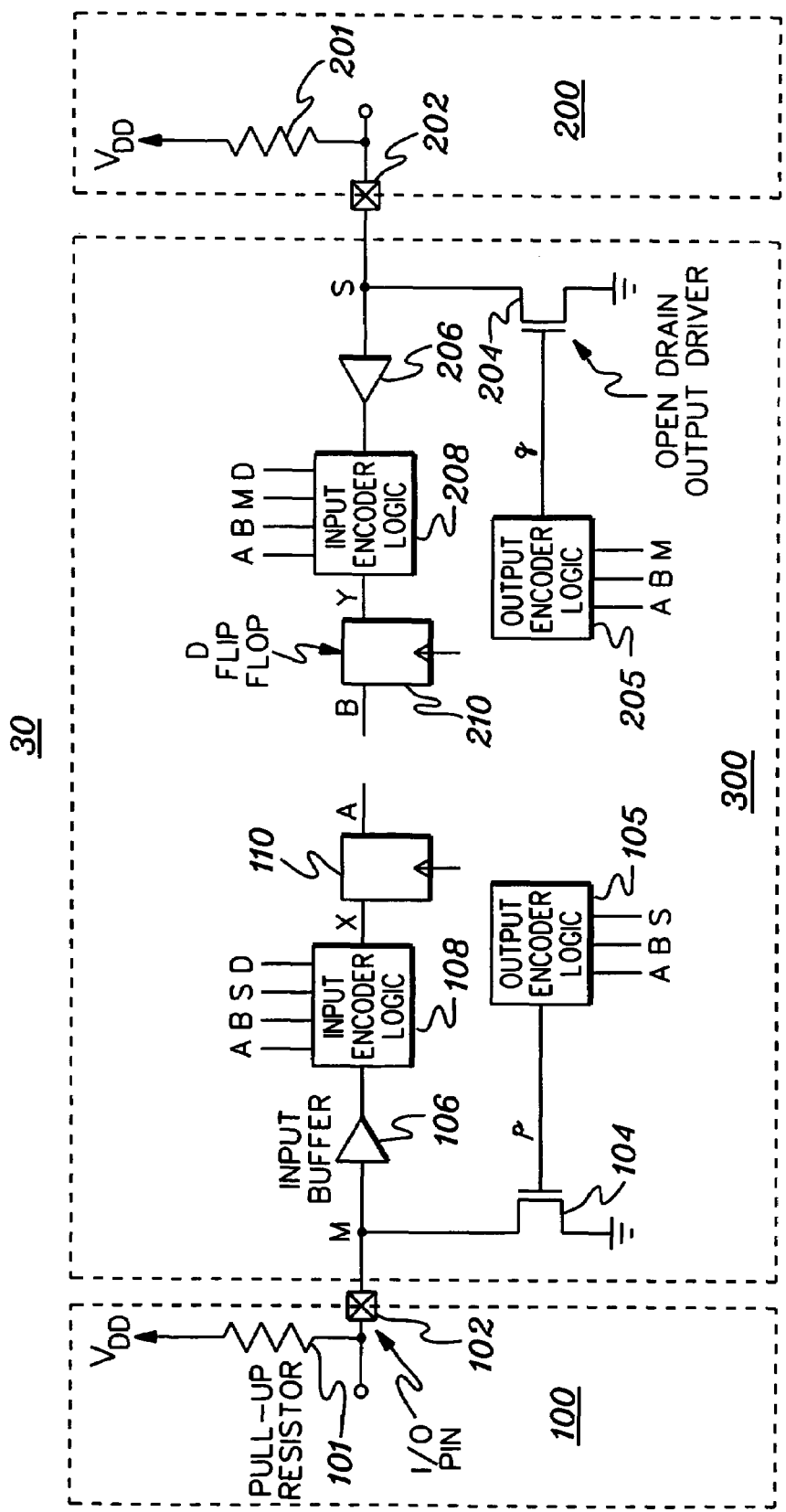
FIG. 2 illustrates an exemplary communication system configured in accordance with an aspect of the present invention for avoiding oscillation on the bus coupling devices thereof.

FIG. 2 illustrates an exemplary embodiment of a bi-directional communication system 30 between a first device 100 and a second device 200, which advantageously avoids oscillation on the bus therebetween in accordance with an aspect of the present invention. (The designations first and second as used herein, with respect to any device, component, element, signal, etc., are for identification and illustration purposes only and do not designate any type of priority or arrangement.) Block 300 represents the state machine control for communication system 30 of FIG. 2.

Each device 100 and 200, respectively, has a bi-directional input/out pin 102 and 202, respectively. The input/output pins are pulled to a logic high level by pull-up resistors 101 and 201, respectively. Communication system 30 is illustrated in FIG. 2 as comprising a first bus driver 104 and a second bus driver 204. The first and second bus drivers 104 and 204, respectively, connect input/output pins 102 and 202, respectively, to ground. Drivers 104 and 204 each respectively comprise a switching element, such as a bipolar junction transistor (i.e., in an open collector configuration), a field effect transistor (i.e., in an open drain configuration), or any other suitable switching element. An output encoder logic block 105 provides an input signal p to driver 104; and an output encoder logic block 205 provides an input signal q to driver 204.

First bus driver 104 provides a first signal M to a first input encoder logic block 108 via a buffer 106. The first input encoder logic block also receives as inputs a current first state signal A, a current second state signal B, and a second signal S. In addition, a logic delay signal D is provided as an input to first input encoder logic block 108. The first input encoder logic block 108 generates a next first state signal X. The next first state X is provided to a gate 110 (e.g., a D flip-flop) that outputs the next first state X as the current first state A on the state machine clock. The current first state A is fed back to first and second input encoder logic blocks 108 and 208, respectively, and to first and second output encoder logic blocks 105 and 205, respectively. The first signal M is also provided as an input to second output encoder logic block 205.

Second bus driver 204 provides the second signal S to the second input encoder logic block 208 via a buffer 206. The second input encoder logic block also receives as inputs the current first state signal A, the current second state signal B, and the second signal S. In addition, the logic delay signal D is provided as an input to second input encoder logic block 208. The second input encoder logic block 208 generates a next second state signal Y. The next second state Y is provided to a gate 210 (e.g., a D flip-flop) that outputs the next second state Y as the current second state B on the state machine clock. The current second state B is fed back to first and second input encoder logic blocks 108 and 208, respectively, and to first and second output encoder logic blocks 105 and 205, respectively. The input signal S is also provided as an input to first output encoder logic block 105.

Figure 3:
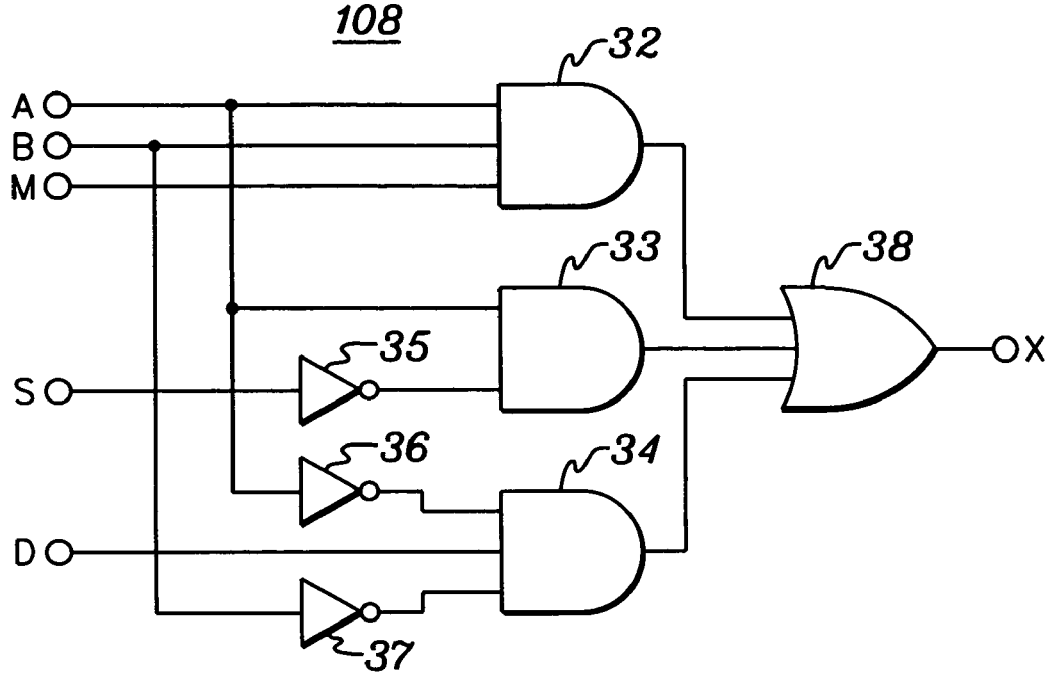
FIG. 3 is a logic circuit diagram for an exemplary first input encoder logic block useful in the communication system of FIG. 2.

FIG. 3 is a logic circuit diagram illustrating an exemplary embodiment of first input encoder logic block 108. As illustrated, first input encoder logic block 108 receives as inputs the current first state signal A, the current second state signal B, the first signal M, the second signal S, and the logic delay signal D. A logical expression for the input encoder logic block implementation of FIG. 3 is as follows:

$$X = \overline{M}SA + M\overline{A}\ B + \overline{M\overline{A}}\ B + \overline{D}\overline{A}\ B$$

with AND gates 32–34, inverters 35–37 and OR gate 38 being utilized as illustrated to implement the logical expression for X. FIG. 4 is a Karnaugh map 40 useful for developing the first input encoder logic.

Figure 5:
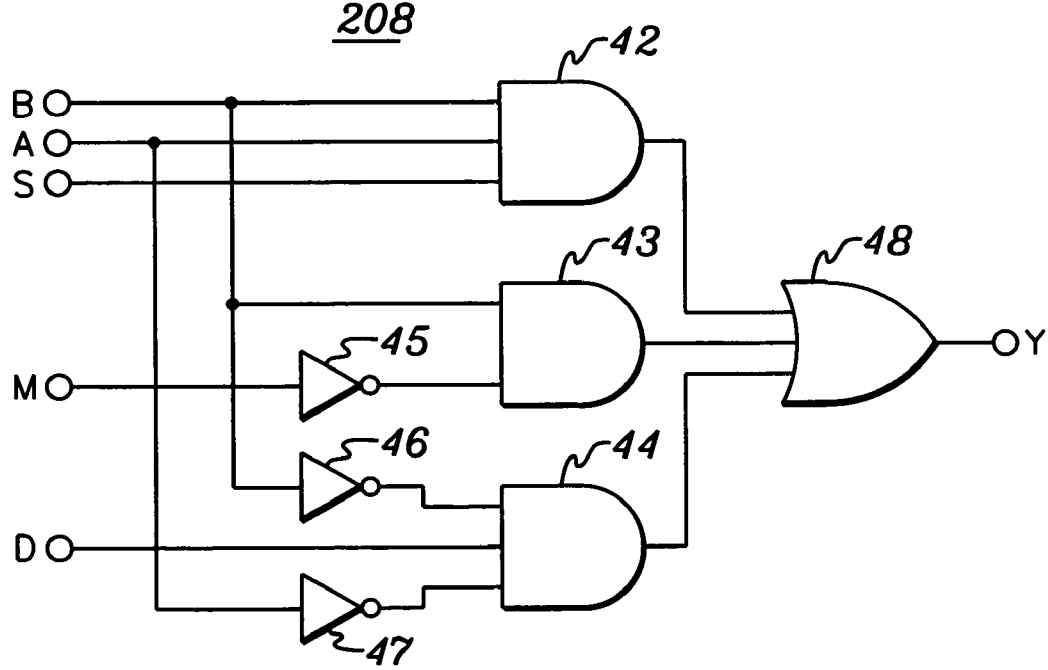
FIG. 5 is a logic circuit diagram for an exemplary second input encoder logic block useful in the communication system of FIG. 2.

In like manner as FIG. 4, FIG. 5 is a logic circuit diagram illustrating an exemplary embodiment of second input encoder logic block 208. As illustrated, second input encoder logic block 208 receives as inputs the current first state signal A, the current second state signal B, the first signal M, the second signal S, and the logic delay signal D. A logical expression for the second input encoder logic block implementation of FIG. 5 is as follows:

$$Y = M\overline{S}AB + SA\overline{B} + \overline{S}A\overline{B} + \overline{D}A\ B$$

with AND gates 42–44, inverters 45–47 and OR gate 48 being utilized as illustrated to implement the logical expression for Y. FIG. 6 is a Karnaugh map 50 useful for developing the second input encoder logic.

Figure 7:
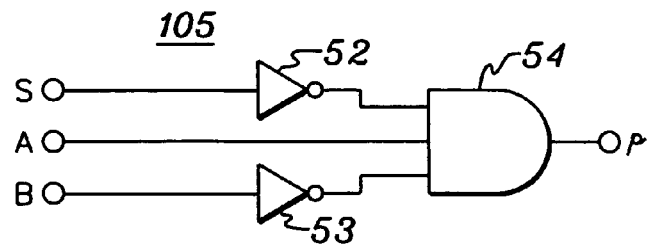
FIG. 7 and FIG. 8 are logic circuit diagrams for exemplary output encoder logic blocks useful in the communication system of FIG. 2.

FIG. 7 is a logic circuit diagram illustrating an exemplary embodiment of first output encoder logic block 105. As illustrated, first output encoder logic block 105 receives as inputs the current first state signal A, the current second state signal B, and the second signal S. A logical expression for the input encoder logic block implementation of FIG. 7 is as follows:

$$p = A\overline{B}\ \overline{S}$$

with inverters 52 and 53 and AND gate 54 being utilized as illustrated to implement the logical expression for p.

Figure 8:
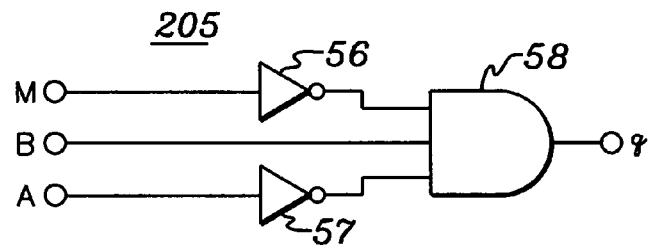

In similar fashion, FIG. 8 is a logic circuit diagram illustrating an exemplary embodiment of second output encoder logic block 205. As illustrated, second output encoder logic block 205 receives as inputs the current first state signal A, the current second state signal B, and the first signal M. A logical expression for the first output encoder logic block implementation of FIG. 8 is as follows:

$$q = \overline{A}\,B\overline{M}$$

with inverters 56 and 57 and AND gate 58 being utilized as illustrated to implement the logical expression for q.

Figure 9:
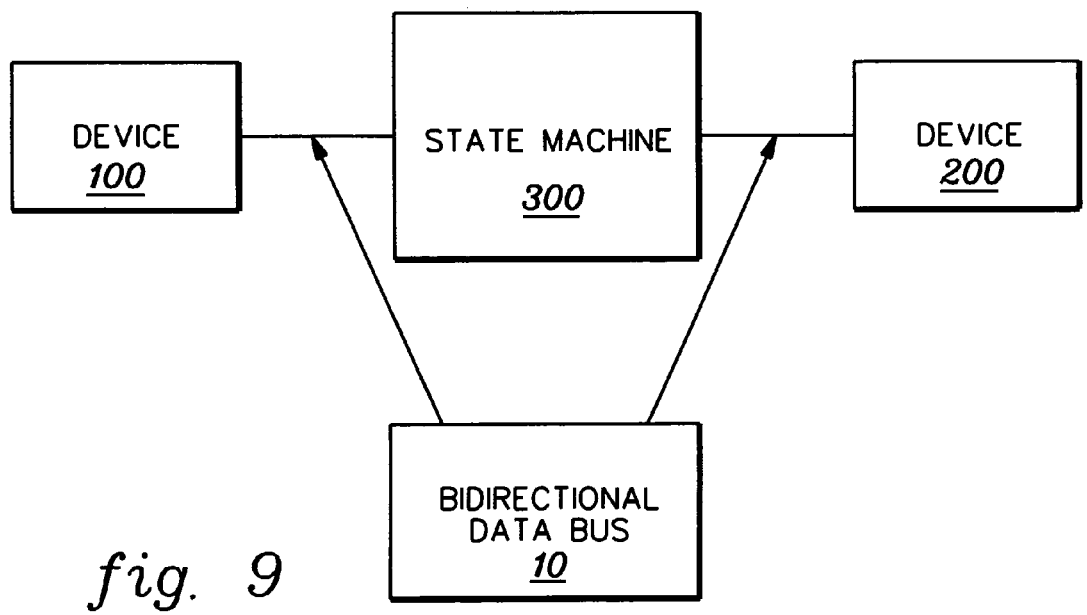
FIG. 9 is a block diagram representation of a communication system in accordance with an aspect of the present invention.

FIG. 9 is a high-level block diagram illustration of a communication system in accordance with preferred embodiments of the present invention. State machine 300 can be instantiated within a programmable logic device or with standard VTL logic devices, for example. Bi-directional bus 10 is illustrated in FIG. 9 as traversing state machine 300.

In operation, either first device 100 or second device 200 desires to send data to the other device. In order to initiate the transmission of data from the transmitting device to the receiving device, the transmitting device drives its input/output pin to a logic low level, such that when the communication system 30 (FIG. 2) is in an idle state, the input/output pin of the receiving device is driven to a logic low level. In accordance with an aspect of the present invention, a logic delay signal D is utilized in conjunction with input and output encoding logic to ensure that the bus 10 between devices 100 and 200 has completed a transition from a logic low level to a logic high level signal prior to transmission of the signal, thereby avoiding oscillation on the bus. In particular, when state machine 300 enters the wait state (AB=00), a timer (not shown) in state machine 300 is loaded and decremented a predetermined amount of time. Once time=0 is reached, the logic delay signal D is set to a logic level one, and the state machine exits the wait state (AB=00), thus returning to the idle state (AB=11). This advantageously provides immunity to rise time on the bus associated with the RC time constant of the data line, thereby avoiding oscillation.

Figure 10:
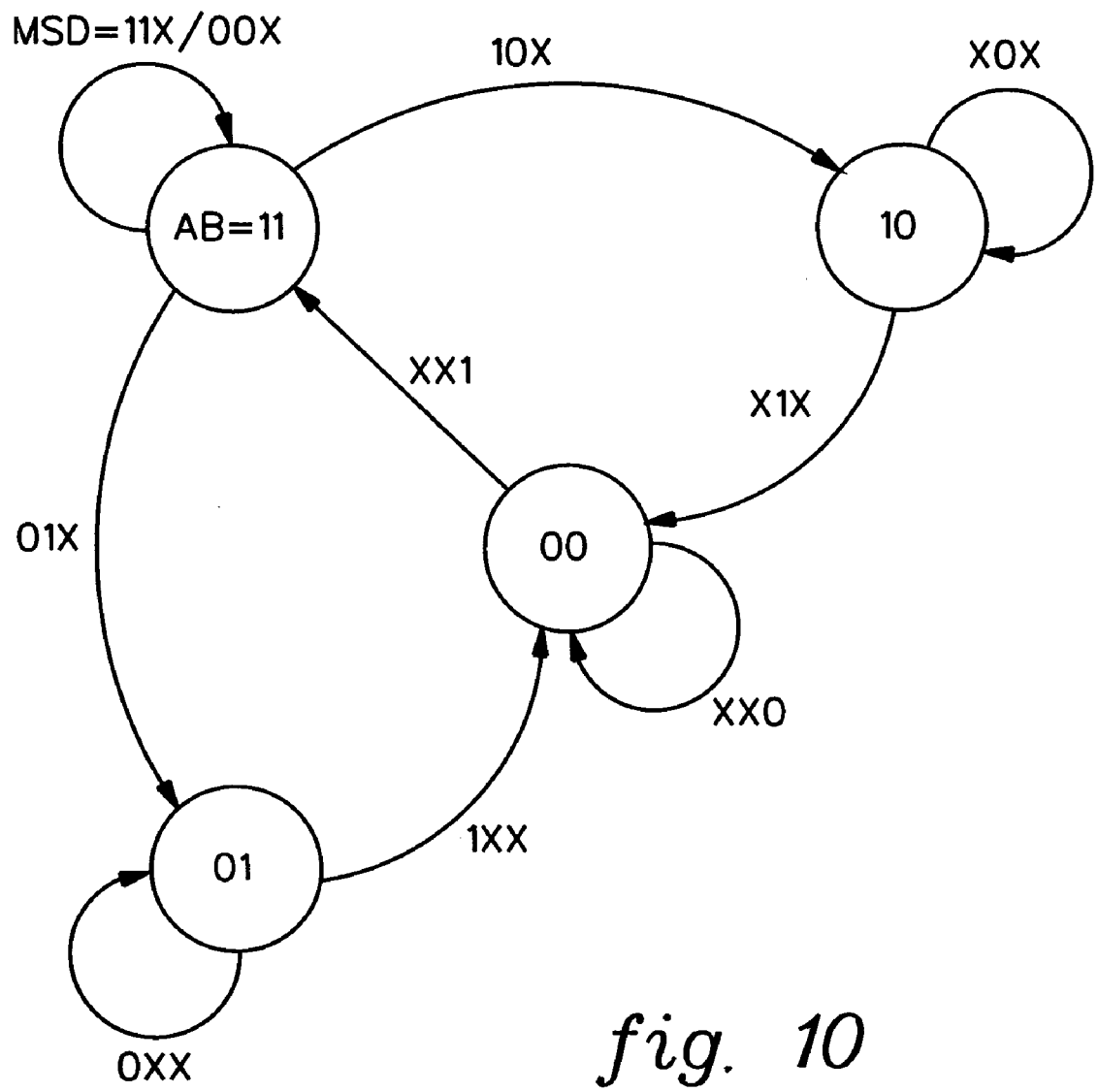
FIG. 10 is a state diagram representation of a state machine controller for avoiding oscillation in accordance with an aspect of the present invention.

FIG. 10 is an exemplary state diagram for a communication system, such as system 30 of FIG. 2, useful for describing operation thereof in accordance with preferred embodiments of the present invention.

Upon initialization, the first state signal A and the second state signal B are both logic high, and the state defaults to the idle state AB=11. If the first signal M and the second signal S are both logic high (MS=11), then neither device 100 or 200 is attempting to transmit to the other. On the other hand, if both the first signal M and the second signal S are logic low (MS=00), then both devices 100 and 200 are attempting to transmit at the same time. Under these conditions, the system remains in the idle state AB=11. The MS=00 condition is considered a collision, and collisions are not valid for half-duplex open-collector protocols.

When either device 100 or 200 is attempting to communicate with the other, logic delay signal D is utilized as a flag to indicate that the wait time for a transition from a low logic level signal to a high logic level signal on the bus between devices has been completed. State AB=00 is the wait state. When the logic delay signal D transitions from 0 to 1, then the state machine returns to the idle state AB=11. FIG. 11 is a state transition table for the state diagram of FIG. 10.

For example, if the first device 100 is attempting to send a logic low signal to the second device 200, then device 100 would assert a logic 0 at input/output pin 102. The transmission would begin when the state machine is in the idle state (AB=11). The signal M goes low when a logic 0 is asserted at pin 102, causing the state machine to transition to state AB=01. The machine will remain in state AB=01, causing output signal q to go high, driving the value of signal S at pin 202 low. This sequence successfully drives a logic low signal from device 100 to device 200.

The state machine will not leave state AB=01 until device 100 desires to send a logic high signal to second device 200. In so doing, device 100 releases the bus at input/output pin 102, allowing the open collector output to return to logic high via pull-up resistor 101. This causes the signal M to assume a logic high value. The state machine transitions to state AB=00, i.e., the wait, or delay, state. Once in the wait state, output signal q goes low, turning off driver 204, allowing signal S to return to a high value via pull-up resistor 201. The state machine remains in the wait state until the delay signal D becomes a logic high. An external time process may be employed to set the signal D to a logic high level a predetermined amount of time later, thereby accounting for the RC rise time of signal S. When signal D becomes a logic high, then the state machine returns to the idle state. This sequence successfully drives logic high from device 200, while advantageously avoiding oscillation on the bus.

Advantageously, communication system 30 (FIG. 2) achieves self-synchronous, bi-directional communication between devices 100 and 200 without oscillation on the bus between the devices, and without the use of a directional control line. Communication system 30 may be implemented using individual logic elements as part of an integrated circuit. The communication system may be also part of a larger system, for example, such as in an application specific integrated circuit (ASIC), a complex programmable logic device (CPLD), or a field programmable gate array (FPGA). The system may also be used to create high level switching and routing functions, such as multiplexors and demultiplexors.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A communication system, comprising:
   an open-drain or open-collector bi-directional bus coupling two semiconductor devices; and
   a state machine control for controlling bi-directional communication between the devices by providing a logic delay for adaptively idling the bus during a logic level transition between states of communication between the two devices, the logic delay comprising a predetermined time greater than a predetermined rise time of the bus, such that a logic level transition is not communicated until the logic level transition is complete.

2. The communication system of claim 1 wherein the logic delay causes the state machine to remain in a wait state until the logic delay transitions from a low logic level to a high logic level.

3. The communication system of claim 1 wherein the state machine control comprises a timer for providing the logic delay.

4. The communication system of claim 1, further comprising:
   a first bus driver for controlling a state of a first signal at an input/output pin of a first device of the two devices; and
   a second bus driver for controlling a state of a second signal at an input/output pin of a second device of the two devices.

5. The communication system of claim 4 wherein inputs to the state machine comprise a current first state, a current second state, a next first state, a next second state, the first signal, and the second signal.

6. The communication system of claim 1, further comprising:
   a first bus driver for receiving a first drive signal based on a current first state, a current second state and a second signal, and generating therefrom a first signal;
   a second bus driver for receiving a second drive signal based on the current first state, the current second state and the first signal, and generating therefrom the second signal;
   a first input encoder logic for receiving the current first state, the current second state, the first signal and the second signal, and generating therefrom a next first state; and
   a second input encoder logic for receiving the current first state, the current second state, the first signal and the second signal, and generating therefrom a next second state.

7. A method for controlling communication in an open-drain or open-collector bi-directional bus coupling two semiconductor devices, comprising:
   providing control logic for determining the state of communication between the devices; and
   providing a logic delay for adaptively idling the bus during a logic level transition between states of communication between the two devices, the logic delay comprising a predetermined time greater than a predetermined rise time of the bus, such that a logic level transition is not communicated until the logic level transition is complete.

8. The method of claim 7 wherein the logic delay provides a wait state until the logic delay transitions from a low logic level to a high logic level.

9. The method of claim 7, further comprising:
   controlling a state of a first signal at an input/output pin of a first device of the two devices; and
   controlling a state of a second signal at an input/output pin of a second device of the two devices.

10. The method of claim 9, further comprising:
    providing a current first state and a current second state;
    providing a first input encoder logic for receiving the current first state, the current second state, the first signal and the second signal, and generating therefrom a next first state; and
    providing a second input encoder logic for receiving the current first state, the current second state, the first signal and the second signal, and generating therefrom a next second state.

* * * * *